No. 853,906. PATENTED MAY 14, 1907.
M. SOMERS.
RETAINING VALVE.
APPLICATION FILED NOV. 12, 1906.
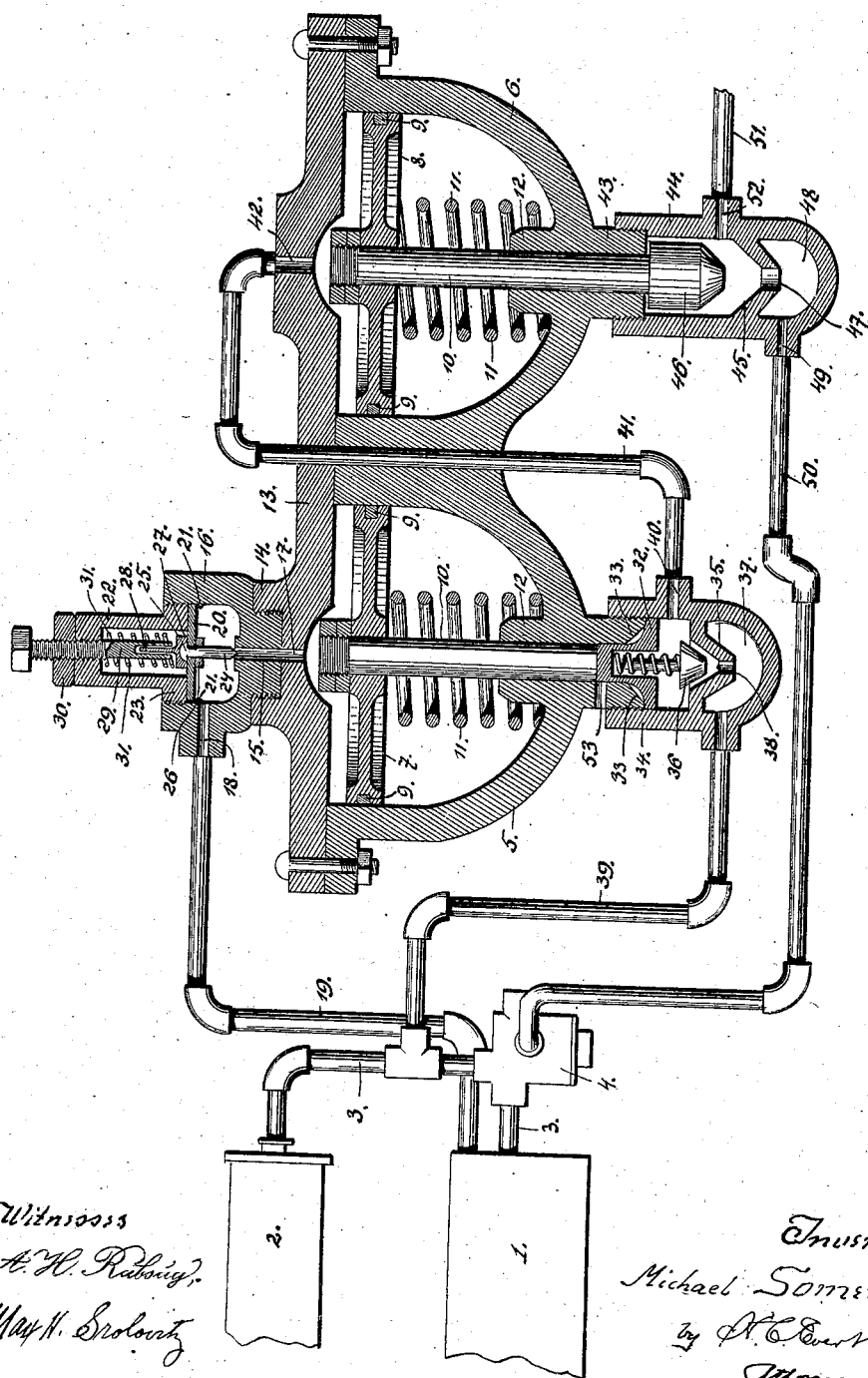
Witnesses
A. H. Rabony
May H. Srolovitz
Inventor
Michael Somers
by H. C. Evert Co.
Attorneys
THE NORRIS PETERS CO., WASHINGTON, D. C.

UNITED STATES PATENT OFFICE.

MICHAEL SOMERS, OF EAST PITTSBURG, PENNSYLVANIA.

RETAINING-VALVE.

No. 853,906.     Specification of Letters Patent.     Patented May 14, 1907.

Application filed November 12, 1906. Serial No. 343,030.

*To all whom it may concern:*

Be it known that I, MICHAEL SOMERS, a citizen of the United States of America, residing at East Pittsburg, in the county of Allegheny and State of Pennsylvania, have invented certain new and useful Improvements in Retaining-Valves, of which the following is a specification, reference being had therein to the accompanying drawing.

This invention relates to retaining valves for air brake systems, and its primary object is to provide effective means for preventing the exhausting of the brake cylinders when the air tank or reservoir is charged.

The construction of the improvement will be fully described hereinafter in connection with the accompanying drawing, which forms part of this specification, and its novel features will be defined in the appended claims.

The drawing represents a central vertical section of the improvement in connection with an air reservoir and brake cylinder said reservoir and cylinder as well as the pipe connections being shown in elevation.

The reference numeral 1 designates the air tank or reservoir and 2 the brake cylinder, the pipe connection 3 between said cylinder and said reservoir being equipped with the usual triple valve 4.

I employ two valve casings 5 and 6, within each of which is a piston designated respectively by the numerals 7 and 8 and having peripheral packing 9. Each of the pistons 7 and 8 is centrally bored and threaded to receive a threaded stem 10 surrounded by a coil spring 11, the lower ends of said springs encircling sleeves 12 formed at the bottom of each of said valve casings 5 and 6.

The two casings 5 and 6 are closed by a cover-plate 13 and said cover-plate is provided centrally above the casing 5 with a threaded socket 14 to receive a threaded boss 15 depending from a diaphragm chamber 16 having a port 17 communicating with the casing 5, and a port 18 communicating by a pipe 19 with the air reservoir 1.

A diaphragm 20 is supported within the chamber 16 upon an annular flange 21, being held thereon by a hollow plug 22 having a threaded collar 23 engaging the upper threaded end of the chamber 16. A needle valve 24 having a head 25 extends through the center of the diaphragm to control the port 17 said valve 24 being secured below the diaphragm by a nut 26 and above the diaphragm by a guide 27, recessed on its under surface to receive the head 25 and having a pin extension 28 fitting within a hollow stem 29 threaded through the upper end of the plug and held by a jam nut 30. A coil spring 31 surrounds the stem 28 as shown.

The stem 10 within the casing 5 carries a hollow valve 32 fitting a beveled seat 33 below the casing 5, said seat 33 being exteriorly threaded to receive a valve chamber 34 internally threaded for attachment to the seat 33 and formed with a conical valve-seat 35 to receive a spring-pressed valve 36 the stem of which extends into the hollow valve 32. An air passage 37 is arranged below the port 38 in the valve seat 35 and said passage has a pipe connection 39 with the brake cylinder pipe 3. The valve chamber 34, is connected by a port 40 and pipe 41 with a port 42 formed in the cover-plate 13 above the casing 6.

To a threaded sleeve 43 depending from the casing 6 is attached a valve chamber 44 having a seat 45 for a beveled valve 46 controlling a port 47 in the seat 45. An air passage 48 below the valve seat 45 communicates through a port 49, and a pipe 50 with the triple valve 4. An exhaust pipe 51 connects with a port 52 in the valve chamber 44 and an exhaust port 53 is formed in one side of the valve seat 33.

When air is discharged from the train pipe the triple piston drops and establishes connection between the reservoir 1 and the cylinder 2. Air passes through the pipe 39 and port 38 to the port 40 and pipe 41 to the upper side of the piston 8 and this closes the exhaust ports 47 and 52 preventing exhaust from the triple valve.

When the pressure in the reservoir is sufficient to raise the piston in the triple valve the exhaust to the cylinder 2 is closed and air passes through the pipe 19 to the space above the piston 7 to close the pipe 39 and allow the air above the piston 8 to exhaust through the port 53. The piston 8 then raises and the triple valve and brake cylinder exhaust through the port 52. In normal running condition the valve 24 will be closed as will also be the valve 32. The spring 31 is of greater relative tension than the spring 11 in the chamber 5.

What I claim and desire to secure by Letters Patent, is:—

1. The combination with the air reservoir, triple valve and brake cylinder of an air brake, of a double valve casing, comprising two independent chambers, a piston in each of said chambers, a depending valve chamber below one of said casings having a pipe connection with the brake cylinder, and a pipe connection with the top of the adjacent casing, oppositely disposed valves within said depending chamber, a depending valve chamber below the other casing having a pipe connection with the triple valve, and an exhaust port, a valve controlling said exhaust, and means for admitting air from the reservoir to one of said casings.

2. The combination with the air reservoir, triple valve and brake cylinder of an air brake, of a double valve casing comprising two independent chambers, a piston in each of said chambers, a depending valve chamber below one of said casings having a pipe connection with the brake cylinder, and a pipe connection with the top of the adjacent casing, oppositely disposed valves within said depending chamber, a depending valve chamber below the other casing having a pipe connection with the triple valve, and an exhaust port, a valve controlling said exhaust, and means for admitting air from the reservoir to one of said casings comprising a diaphragm chamber above said casing, a diaphragm therein, a pipe connection between the reservoir and diaphragm chamber, and a valve extending centrally through said diaphragm controlling a port connecting said diaphragm chamber with the casing below it.

In testimony whereof I affix my signature in the presence of two witnesses:

MICHAEL SOMERS.

Witnesses:
JOHN T. KELLY,
ALEX R. JOHNSTONE.